(No Model.)
W. H. STRATTON.
AUTOMATIC VALVE FOR DRY PIPE FIRE EXTINGUISHERS.
No. 420,977. Patented Feb. 11, 1890.
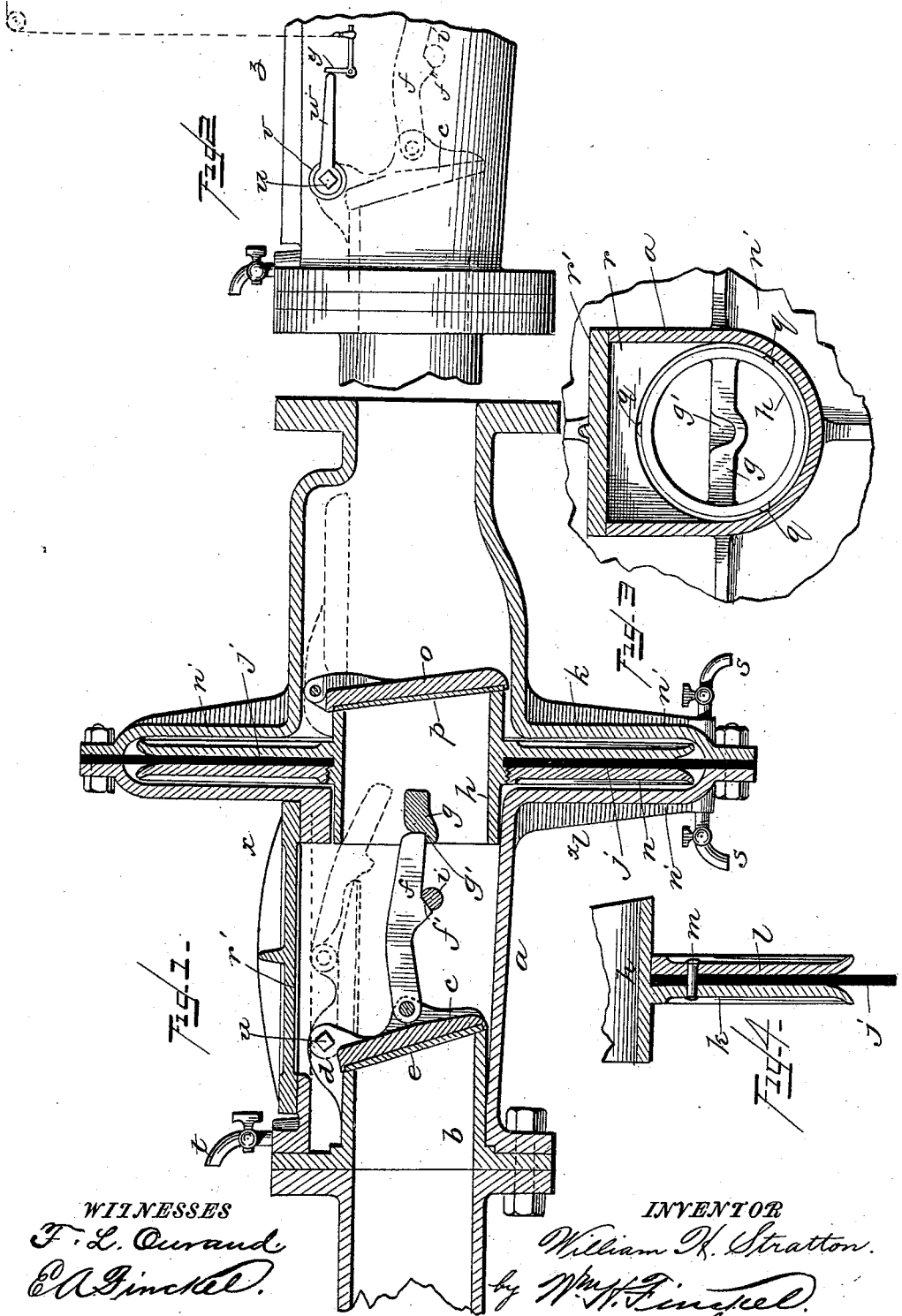
WITNESSES
F. L. Durand
E. A. Ginckel
INVENTOR
William H. Stratton
by Wm. H. Ginckel
his Attorney

UNITED STATES PATENT OFFICE.

WILLIAM H. STRATTON, OF PROVIDENCE, RHODE ISLAND.

AUTOMATIC VALVE FOR DRY-PIPE FIRE-EXTINGUISHERS.

SPECIFICATION forming part of Letters Patent No. 420,977, dated February 11, 1890.

Application filed June 15, 1889. Serial No. 314,393. (No model.)

*To all whom it may concern:*

Be it known that I, WILLIAM H. STRATTON, a citizen of the United States, residing at Providence, in the county of Providence and State of Rhode Island, have invented a certain new and useful Improvement in Automatic Valves for Dry-Pipe Fire-Extinguishers, of which the following is a full, clear, and exact description.

It is quite common to apply to buildings a system of pipes provided with outlets which are sealed with a substance that will yield under an abnormal rise in temperature and open the pipes and release a fire-extinguishing medium—such, for example, as water. In some instances these outlets have been sealed so as to resist the pressure of the water contained in the pipes. In other instances the pipes are normally emptied of water and a vacuum produced therein, so that upon the unsealing of the pipes atmospheric air will rush in to operate a valve mechanism to turn into the pipes the water supply, and in still other instances the pipes have been emptied of water and charged with air under pressure, so that when an outlet is opened the escape of the air will serve to operate water-introducing valve mechanism.

Those systems in which the pipes are normally emptied of water are designated in the trade as "dry-pipe" systems; and my invention relates to such dry-pipe systems, and more particularly to those systems in which the pipes are normally charged with air-pressure.

The invention consists of a water-valve for dry-pipe systems of fire-extinguishers held closed against the pressure of water by means of air-pressure, and released to permit the escape of the water by the withdrawal of the air-pressure consequent upon the unsealing of an outlet, as I will proceed now more particularly to set forth and claim.

In the accompanying drawings, in the several figures of which like parts are similarly designated, Figure 1 is a sectional elevation. Fig. 2 is an outside elevation; Fig. 3, a transverse section taken in the plane of line $x\ x$, Fig. 1; and Fig. 4 is a section of a modification.

In order to make this specification concise I will confine the description to the form of apparatus shown in the aforesaid drawings; but I do not wish to be understood to thereby limit my invention to the mere details shown.

$a$ is the shell containing the operative parts of my valve. This shell is adapted to be interposed in the line of pipe at a suitable place. In one end of the shell is arranged a tubular valve-seat $b$, to which is hinged an ordinary check-valve $c$, hereinafter called the "water-valve." The preferred construction is to make the valve-seat inclined and to hinge the valve to ears $d$, projecting from the upper portion of the valve-seat, so that the valve would naturally or by gravity tend to close the port. The valve may be provided with packing $e$. This valve $c$ is provided with a bar $f$, hinged thereto and adapted to engage a cross-piece $g$, which is arranged in a tube $h$. The cross-piece $g$ is provided with a seat $g'$ to receive the end of the bar $f$. The lower side of the bar is provided with an inclined projection $f'$, adapted to co-operate with a corresponding surface on a bar $i$, fixed transversely in the shell. When the bar $f$ is seated in the cross-piece $g$, as shown in full lines in the drawings, it will be observed that it has a right-line resistance to the movement of the valve $c$, and therefore would hold the said valve closed against the escape of water through the port in the valve-seat $b$.

In order to provide for the release of the valve $c$ it is necessary to disengage the bar $f$ from the cross-piece $g$, and to this end the tube $h$ is made movable within the shell and is supported within the shell by means of a flexible diaphragm $j$. This diaphragm is secured to the said tube in any suitable manner. I have shown two ways of connecting the diaphragm and tube. In Fig. 1 the tube is formed with a flange $k$, and is provided with a corresponding removable flange $l$, and the diaphragm is first placed about the tube and against the flange $k$, and then the flange $l$ is screwed into position up against the diaphragm. In Fig. 4 one of the flanges is made fast to the tube and the other is made attachable, and the two flanges, with the interposed diaphragm, are united by rivets or bolts or other equivalent means $m$. The flanges $k$ and $l$ serve to protect the diaphragm against injurious action, and also to impart the necessary rigidity to it to sustain the weight of the tube, its valve, and the other connected parts. The diaphragm is arranged within a chamber $n$, formed in the shell, and the outer edges of the said diaphragm are clamped between the meeting edges of the walls $n'$ $n'$ of said chamber in any suitable and usual manner to form an air-tight and water-tight joint. The end of the tube $h$ farthest from the water-valve is made as a valve-seat, and there is hinged to the said tube a check-valve $o$, whose face may be packed, as at $p$, to make a tight joint with the tube $h$. The valve $c$ being closed and its bar being seated in the cross-piece, as shown, if air-pressure be admitted into the system of pipes on the right-hand side of the check-valve $o$ and the diaphragm, the said diaphragm and its tube and valve will be moved toward the water-valve, and thereby, through the intervention of the bar $f$, hold the said water-valve closed against the pressure of water. It will be noticed that the superficial area of the air-valve and of the diaphragm is very much greater than the water-valve, and hence it is possible to employ a very slight pressure of air in order to perfectly hold the water-valve against a very much greater pressure of water. Upon the unsealing or opening of any one of the water-outlets to the right-hand side of the diaphragm the air-pressure will escape and the water-pressure will be free to exert itself, and in consequence will open the water-valve, and in so doing will move the bar $f$ to the right, and its inclined surface, then riding up upon the inclined surface of the bar $i$, will disengage the said bar $f$ from the cross-piece $g$, and thus permit the water to force the water-valve and its attached bar up into the dotted-line position. Of course the pressure of the water acting upon the air-valve will open it and hold it in a position substantially such as indicated by the dotted lines.

In order to compensate in the water-way for the obstructions $i$ and $g$, I make the tube $h$ of proportionately larger diameter.

In order to insure parallelism of movement of the tube $h$ and at the same time not to impair its freedom of motion necessary to the sensitiveness of the diaphragm, I may arrange on the periphery of the said tube three (more or less) ribs $q$, to bear against the adjacent surfaces of the shell. (See Fig. 3.)

The shell next to the water-valve is provided with a hand-hole $r$, having a cover $r'$, whereby access may be had to the water-valve and the other parts of the valve mechanism for repairs and other purposes without removal of the said valves and other parts.

In order to provide for the drainage of the valve, I arrange drip-cocks $s$ at the lower portions of the diaphragm-chamber for use when the valve is arranged horizontally, as shown. When the valve is arranged vertically, then such drip-cocks may be arranged as at $t$.

The water-valve has its stem $u$ extended through the shell within a stuffing-box $v$, and the end of the said stem is squared to receive a handle $w$, the said handle being preferably arranged to stand horizontal when the valve is closed, so that it may abut against a bell-crank lever $v$, fulcrumed on the shell. This bell-crank lever may be connected by a chain $z$ or other connection with a suitable alarm mechanism, and such connection will be made under tension in usual manner. When the water-valve is opened, its handle will move upwardly and away from the bell-crank lever, and the strained alarm-connection, acting upon the said bell-crank lever, will rotate the said lever and free itself from the said lever, and thus set going the alarm. The valve-handle thus not only operates the alarm, but its position serves to indicate the condition of the water-valve open or shut.

The manner of resetting the parts for use would seem to be obvious without further explanation. It will be observed that the water-valve and its bar may be turned up entirely out of the shell through the hand-hole when it is necessary to repack or otherwise repair or clean the said water-valve without disturbing the piping or the position of the valve in the piping. The formation of the shell is such as to cause any water therein to drain either into the lower part of the chamber $n$ or into the lower part of the chamber in which the water-valve is arranged, according to whether the valve be arranged horizontally or vertically.

A light spring may be interposed between the valve $c$ and the shell or other fixed part, in order to insure the fall of the valve when the water-pressure is withdrawn.

It will be observed that upon the descent of the water-valve its bar $f$ falls into place to lock the said valve to its seat automatically.

The chamber between the water-valve and the air-valve is normally without pressure, and therefore there is no necessity for packing the stem $u$ to prevent leakage; hence the stem may be connected directly to the water-valve and be passed freely through the shell, and so work without friction and without binding upon the water-valve and without tendency to resist or restrain its opening readily when released by the movement of the diaphragm. In other words, the liability of this stem and of the water-valve to "stick" is reduced to a minimum, if not entirely removed. If there were air or water pressure in this chamber, then the stem would have to be inserted air or water tight, and the evils just mentioned as avoided by my construction would be present and the efficiency of the apparatus or its sensitiveness greatly impaired.

What I claim is—

1. A valve for controlling the admission of water into a dry-pipe fire-extinguishing system, comprising a shell, a water-inlet, a check-valve arranged upon said water-inlet, a bar pivoted to said check-valve, and a cross-piece to receive the thrust of the said bar, and a movable support for said cross-piece retaining the cross-piece under air-pressure and moving from under said cross-piece upon decrease of air-pressure, substantially as described.

2. A valve for controlling the admission of water into a dry-pipe fire-extinguishing system, comprising a shell, a water-inlet arranged in said shell, a check-valve hinged to said water-inlet to close it, a bar pivoted to said check-valve in line with the direction of pressure of water upon said valve, a cross-piece to receive the thrust of the said bar when the valve is acted upon by water-pressure, a tubular support for said cross-piece and which also forms a water-way, and a diaphragm for sustaining the said support, and air-controlling means, substantially such as described, to operate in conjunction with said diaphragm, substantially as and for the purposes specified.

3. A valve for controlling the admission of water into a dry-pipe fire-extinguishing system, comprising a shell, a water-inlet arranged in said shell, a check-valve hinged to said water-inlet, a bar pivoted to said check-valve, a cross-piece to receive the thrust of the said bar, a support for said cross-piece made sensitive to air-pressure, an incline on the said bar, and a co-operating incline fixed in the shell, substantially as and for the purposes described.

4. A valve for controlling the admission of water into a dry-pipe fire-extinguishing system, comprising a shell, a water-inlet arranged in said shell, a check-valve pivoted to said water-inlet, a bar pivoted to said check-valve, a cross-piece to receive the thrust of the said bar, a tubular support for said cross-piece and which also forms a water-way, a diaphragm to sustain said support, and an air-valve co-operating with the support and diaphragm to move the said support to hold and to release the bar of the water-valve, substantially as described.

5. A shell provided with a water-inlet, a check-valve pivoted to said water-inlet, a thrust-bar pivoted to the water-valve, a cross-piece to support the other end of the said bar, means to disconnect the bar and cross-piece, a tube in which the cross-piece is arranged provided with a valve-seat, a check-valve pivoted to said tube, and a diaphragm connected to the tube and rendered sensitive to air-pressure, all combined and arranged to operate substantially as and for the purpose described.

6. A shell having an inlet-chamber, a water-inlet, a valve therefor pivoted at its upper end in said inlet-chamber and having its stem extended outside the shell for connection with an alarm mechanism, a thrust-bar pivoted to said water-valve and also arranged in said inlet-chamber, and means to support and operate the said thrust-bar, substantially as set forth, combined with a hand-hole of substantially the cross-sectional area of said shell, and a cover therefor to admit of the swinging outward of the valve and thrust-bar through said hand-hole, when the cover is removed, without disconnecting the valve and its stem and alarm-connections, substantially as and for the purpose described.

7. The combination, with a shell, of a tube $h$, fitted to said shell loosely and provided with longitudinal ribs disposed upon its periphery, and a flexible diaphragm for supporting the said tube within the shell, substantially as described.

8. The combination, with a valve-shell and an inlet-valve therein, of means to control such valve, the same comprising a valvular tube $h$, having a peripheral flange and a flexible diaphragm arranged next to said flange, and an attachable flange arranged on the other side of the diaphragm and made fast to the tube, substantially as described.

9. A valve for controlling the admission of water into a dry-pipe fire-extinguishing system, comprising a shell, an air-valve normally closed by air-pressure, a water-valve normally closed against water-pressure, the chamber in the shell between the said valves being devoid of the air and water pressure when the said valves are closed, and a stem attached rigidly to the water-valve in said chamber, and thereby adapted to be freely passed through the shell without the necessity of packing and so as to work without friction and without binding upon the water-valve and without tendency to resist or restrain the ready opening of the water-valve when released, and provided outside of the shell with a handle, combined with an alarm mechanism connected with the said handle, substantially as described.

In testimony whereof I have hereunto set my hand this 4th day of June, A. D. 1889.

WILLIAM H. STRATTON.

Witnesses:
GEORGE H. HODGDON,
W. I. SHERWOOD.